(12) United States Patent
Grignon et al.

(10) Patent No.: US 9,767,179 B2
(45) Date of Patent: Sep. 19, 2017

(54) GRAPHICAL USER INTERFACE FOR MODELING DATA

(71) Applicant: International Business Machines Corporation, Armonk, NY (US)

(72) Inventors: Lesley Grignon, Ottawa (CA); France Lapointe, Gatineau (CA); Sean M. McDowell, Ottawa (CA); Blair E. P. Moxon, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 14/310,897

(22) Filed: Jun. 20, 2014

(65) Prior Publication Data

US 2015/0370879 A1    Dec. 24, 2015

(51) Int. Cl.
*G06F 17/30* (2006.01)
*G06F 9/44* (2006.01)

(52) U.S. Cl.
CPC .......... *G06F 17/30589* (2013.01); *G06F 8/34* (2013.01); *G06F 17/30398* (2013.01); *G06F 17/30572* (2013.01)

(58) Field of Classification Search
CPC ................................................ G06F 17/30398
See application file for complete search history.

(56) References Cited

U.S. PATENT DOCUMENTS

| | | | | |
|---|---|---|---|---|
| 5,923,328 A * | 7/1999 | Griesmer | ............. | G06F 3/0481 715/769 |
| 7,143,100 B2 * | 11/2006 | Carlson | ................. | G06F 3/0481 |
| 7,287,032 B2 * | 10/2007 | Attili | ................. | G06F 17/30554 |
| 7,308,417 B1 | 12/2007 | Nathan | | |
| 7,313,761 B1 * | 12/2007 | McClellan | ........ | G06F 17/30572 715/713 |
| 7,383,516 B2 * | 6/2008 | Sauls, Jr. | ............ | G06F 17/2247 707/999.1 |
| 7,639,254 B2 * | 12/2009 | Takiguchi | ......... | G06F 17/30126 345/426 |
| 2004/0135815 A1 * | 7/2004 | Browne | ............ | G06F 17/30274 715/810 |
| 2005/0166189 A1 * | 7/2005 | Ma | .................... | G06F 17/30067 717/136 |
| 2007/0130116 A1 | 6/2007 | Cras et al. | | |
| 2008/0052623 A1 * | 2/2008 | Gutfleisch | ............. | G06F 3/0482 715/713 |

(Continued)

*Primary Examiner* — Kris Mackes
(74) *Attorney, Agent, or Firm* — Shumaker & Sieffert, P.A.

(57) ABSTRACT

Techniques are described for modeling data in a graphical user interface. In one example, a method for modeling data includes generating for output a plurality of data item graphical representations, wherein the data item graphical representations represent data items. The method further includes receiving one or more inputs to select two or more data items from the data item graphical representations and to select a connecting option. The method further includes generating, in response to the one or more inputs, a hierarchical association between the two or more data items, such that the hierarchical association corresponds to the selected connecting option. The method further includes generating for output a hierarchical data graphical representation that graphically represents the two or more data items and the hierarchical association between the two or more data items.

20 Claims, 10 Drawing Sheets

(56) References Cited

U.S. PATENT DOCUMENTS

| | | | |
|---|---|---|---|
| 2010/0088532 A1* | 4/2010 | Pollock | G06F 1/1626 |
| | | | 713/324 |
| 2011/0214086 A1 | 9/2011 | Narayanan et al. | |
| 2012/0151352 A1* | 6/2012 | S. | G06F 3/0482 |
| | | | 715/734 |
| 2012/0221998 A1 | 8/2012 | Rowley et al. | |
| 2014/0047361 A1* | 2/2014 | Gaspar | G06F 3/048 |
| | | | 715/762 |

* cited by examiner

GRAPHICAL USER INTERFACE FOR MODELING DATA

TECHNICAL FIELD

The disclosure relates to business intelligence systems, and more particularly, to a graphical user interface for business intelligence systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may be used to provide insights into such collections of enterprise data, and to enable business users to add, configure, and model new data, and create visualizations of the data. Many BI systems of enterprise data enable users to model data using diagrams, trees, or target visualizations such as crosstabs for multidimensional data. Each of these data modeling methods is associated with respective techniques and requirements.

SUMMARY

In general, examples disclosed herein are directed to techniques for an intuitive graphical user interface (GUI) for importing and connecting data in hierarchical models, such as level-based models and parent-child models. A data modeling GUI of this disclosure may adapt to different screen sizes, resolutions, and orientations, and may be well suited for data modeling on mobile devices such as smartphones and tablet computers. A data modeling GUI of this disclosure enables simple user interactions with graphical elements to assemble data items into data models that can be stored to an enterprise data store.

In one example, a method for modeling data includes generating for output, by a computing device, a plurality of data item graphical representations, wherein the data item graphical representations represent data items. The method further includes receiving, by the computing device, one or more inputs to select two or more data items from the data item graphical representations and to select a connecting option. The method further includes generating, by the computing device, in response to the one or more inputs, a hierarchical association between the two or more data items, such that the hierarchical association corresponds to the selected connecting option. The method further includes generating for output, by the computing device, a hierarchical data graphical representation that graphically represents the two or more data items and the hierarchical association between the two or more data items.

In another example, a computer program product for modeling data includes a computer-readable storage medium having program code embodied therewith. The program code is executable by a computing device to generate for output a plurality of data item graphical representations, wherein the data item graphical representations represent data items. The program code is further executable by a computing device to receive one or more inputs to select two or more data items from the data item graphical representations and to select a connecting option. The program code is further executable by a computing device to generate in response to the one or more inputs, a hierarchical association between the two or more data items, such that the hierarchical association corresponds to the selected connecting option. The program code is further executable by a computing device to generate for output a hierarchical data graphical representation that graphically represents the two or more data items and the hierarchical association between the two or more data items.

In another example, a computer system for modeling data includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to generate for output a plurality of data item graphical representations, wherein the data item graphical representations represent data items. The computer system further includes program instructions, stored on at least one of the one or more storage devices for execution by at least one of the one or more processors via at least one of the one or more memories, to receive one or more inputs to select two or more data items from the data item graphical representations and to select a connecting option. The computer system further includes program instructions, stored on at least one of the one or more storage devices for execution by at least one of the one or more processors via at least one of the one or more memories, to generate in response to the one or more inputs, a hierarchical association between the two or more data items, such that the hierarchical association corresponds to the selected connecting option. The computer system further includes program instructions, stored on at least one of the one or more storage devices for execution by at least one of the one or more processors via at least one of the one or more memories, to generate for output a hierarchical data graphical representation that graphically represents the two or more data items and the hierarchical association between the two or more data items.

The details of one or more embodiments of the disclosure are set forth in the accompanying drawings and the description below. Other features, objects, and advantages will be apparent from the description and drawings, and from the claims.

DETAILED DESCRIPTION

Various examples are disclosed herein for a data modeling graphical user interface (GUI) application that enables modeling hierarchical information from various data sources. In various examples, a data modeling GUI application of this disclosure may generate a GUI with graphical elements that represent data items, and enable a user to connect various data items to create data modeling hierarchies. The data modeling GUI application may enable the user to create level-based and parent-child hierarchies among the data items. The data modeling GUI application may represent the hierarchies in a compact manner that adapts to available screen space in various sizes, resolutions, and orientations of a computing device screen. A data modeling GUI application of this disclosure may be used in the context of an enterprise computing system as described below with reference to FIGS. 1 and 2.

Figure 1:
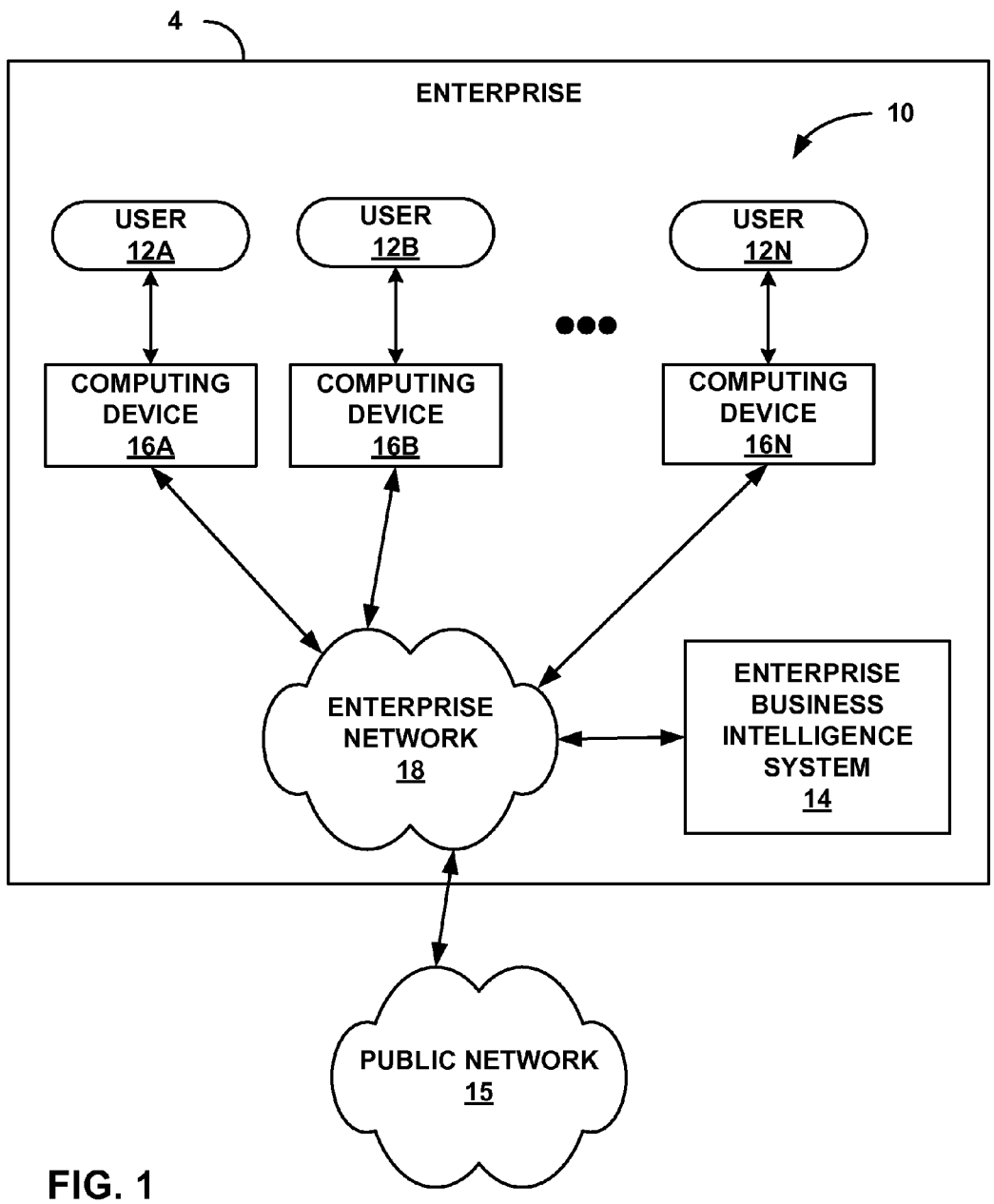
FIG. 1 is a block diagram illustrating an example enterprise having a computing environment in which users interact with an enterprise business intelligence system and data sources accessible over a public network.

FIG. 1 illustrates an example context in which a system of this disclosure may be used. FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15.

Users 12 may use a variety of different types of computing devices 16 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in a web browser, a dedicated mobile application, or other means for interacting with enterprise business intelligence system 14. A user 12 may use one of computing devices 16 to access a data modeling GUI application that interacts with and/or is hosted by enterprise BI system 14. The data modeling GUI application may generate for output a plurality of data item graphical representations that represent data items, receive inputs to select data items from the data item graphical representations and to select a connecting option, and respond to the inputs by generating a hierarchical association corresponding to the selected connecting option between the two or more data items, and generating for output a hierarchical data graphical representation that graphically represents the data items and the hierarchical association between the data items, as further discussed below.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
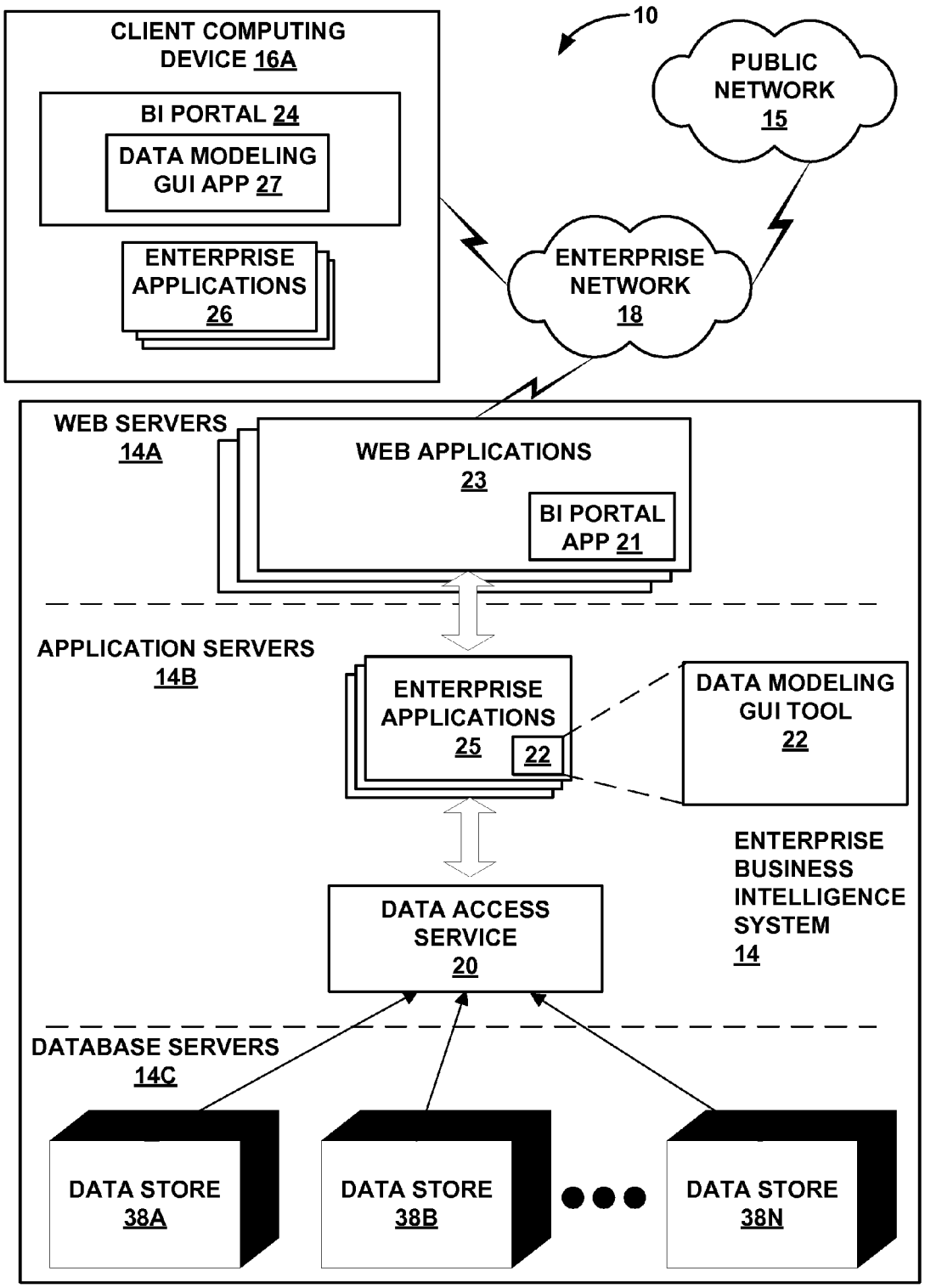
FIG. 2 is a block diagram illustrating one example of an enterprise business intelligence computing environment including a system for modeling data as part of a BI computing system in one example.

FIG. 2 is a block diagram illustrating in further detail portions of one embodiment of an enterprise business intelligence (BI) system 14. In this example implementation, a single client computing device 16A is shown for purposes of example and includes a data modeling GUI 24 and one or more client-side enterprise software applications 26 that may utilize and manipulate multidimensional data, including to view data visualizations and analytical tools with a BI portal 24, which may interact with or include data modeling GUI application 27. Data modeling GUI application 27 may be rendered within a general web browser application, within a locally hosted application or mobile application, or other user interface. Data modeling GUI application 27 may be generated or rendered using any combination of application software and data local to the computing device it's being generated on, and/or remotely hosted in one or more application servers or other remote resources. Many other examples may be implemented in a variety of other contexts outside of BI systems that involve a GUI used in data modeling.

BI portal 24 may output data visualizations for a user to view and manipulate in accordance with various techniques described in further detail below. BI portal 24 may present data in the form of charts or graphs that a user may manipulate, for example. BI portal 24 may present visualizations of data based on data from sources such as a BI report, e.g., that may be generated with enterprise business intelligence system 14, or another BI dashboard, as well as other types of data sourced from external resources through public network 15. BI portal 24 may present visualizations of data based on data that may be sourced from within or external to the enterprise, or from data modeled in data modeling GUI application 27.

FIG. 2 depicts additional detail for enterprise business intelligence system 14 and how it may be accessed and manipulated via interaction with a data modeling GUI 24 for modeling data and providing representations or visualizations of data items and modeled data. Data modeling GUI 24 may provide representations of data items that represent, are imported from, provide data from, or link to any of a variety of types of resource, such as a BI report, a software application, a database, a spreadsheet, a data structure, a flat file, Extensible Markup Language ("XML") data, a comma separated values (CSV) file, a data stream, unorganized text or data, or other type of file or resource. Data modeling GUI 24 may also provide representations of data items in various stages of interaction and data model assembling by a user interacting with data modeling GUI tool 22.

Data modeling GUI tool 22 may be hosted among enterprise applications 25, as in the example depicted in FIG. 2, or may be hosted elsewhere, including on a client computing device 16A, or distributed among various computing resources in enterprise business intelligence system 14, in some examples. Data modeling GUI tool 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

Data modeling GUI tool 22 and/or data modeling GUI application 27 may import data from and upload new data models to enterprise business intelligence (BI) system 14. As depicted in FIG. 2, enterprise BI system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include data modeling GUI tool 22 as one of enterprise software applications 25 or as a portion or portions of one or more of enterprise software applications 25. The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity.

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that may be made accessible to data modeling GUI 24 on client computing device 16A. These may include data items that may be imported or accessed by data modeling GUI tool 22. Data modeling GUI tool 22 may generate outputs for data modeling GUI 24 to include data item graphical representations that represent data items, as further described below.

Example embodiments of the present disclosure, such as data modeling GUI tool 22 depicted in FIG. 2, may enable a user to interact with graphical elements that represent data items to model data for data items represented by the graphical elements. As described above and further below, data modeling GUI tool 22 may be implemented in one or more computing devices, and may involve one or more applications or other software modules that may be executed on one or more processors. Example embodiments of the present disclosure may illustratively be described in terms of the example of data modeling GUI tool 22 in various examples described below.

Figure 3:
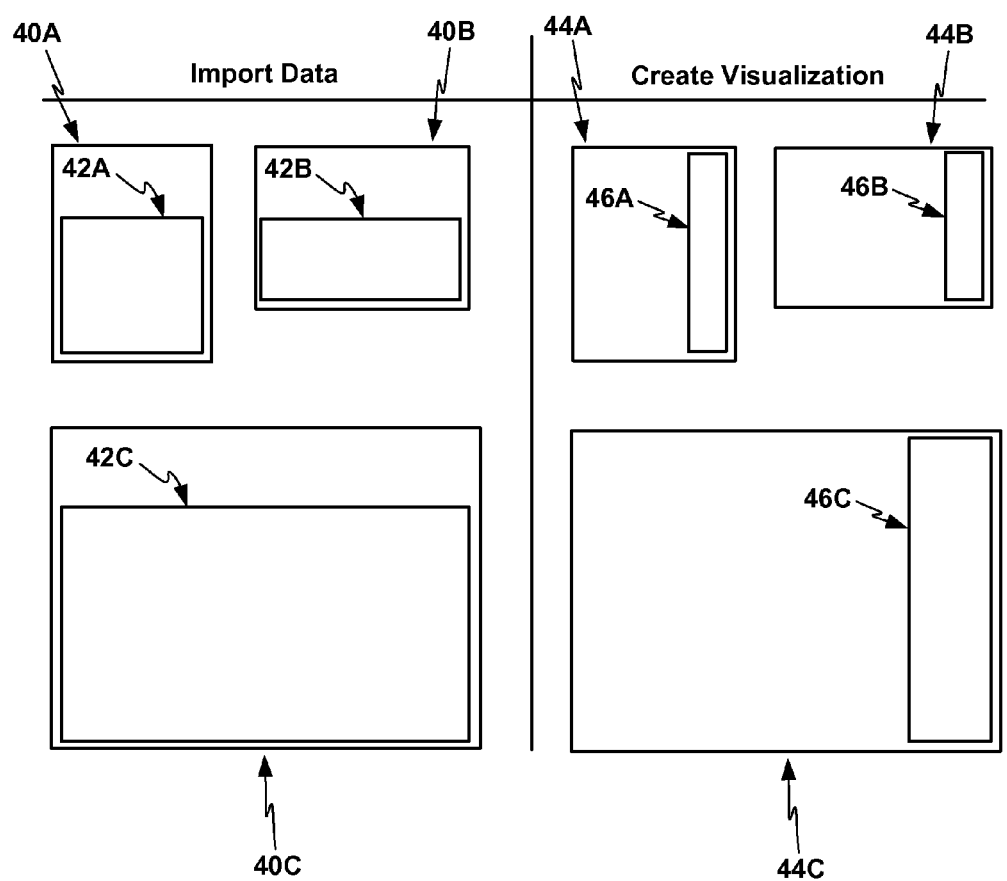
FIG. 3 shows different sizes and shapes of available graphical user interface space that a data modeling graphical user interface (GUI) application assigns for different purposes on a user device screen, in various examples.

FIG. 3 shows different sizes and shapes of available graphical user interface space that a data modeling GUI application (e.g., data modeling GUI application 27 of FIG. 2) assigns for different purposes on a user device screen, in various examples. Data modeling GUI application 27 may assign some portions of the device screen to other purposes, while assigning a portion of the device screen as a GUI for importing data or for creating a data modeling visualization. Data modeling GUI application 27 may detect a screen orientation, resolution, and size of a user device and select an output format based at least in part on the screen orientation, resolution, size of the user device. Data modeling GUI application 27 may then generate an output for the GUI in the selected output format. While some forms of data modeling assume or require a large amount of vertical, horizontal, and/or total screen space or monitor space to be useful, a data modeling GUI application 27 of this disclosure may ensure that data modeling is feasible on device screens that are relatively small or relatively low resolution, and in either a vertical or a horizontal orientation.

In the examples depicted in FIG. 3, data modeling GUI application 27 generates outputs for a majority lower portion of the device screen as an import data GUI box 42A, 42B, 42C in an import data mode, for device screens 40A, 40B, 40C in various example sizes and orientations. In the examples depicted in FIG. 3, data modeling GUI application 27 also generates outputs for a right-hand portion of the device screen as a create data modeling visualization GUI box 46A, 46B, 46C in a create data modeling visualization mode, for device screens 44A, 44B, 44C in various example sizes and orientations. A system of this disclosure may therefore effectively use and adapt to available space to support different device sizes and resolutions and to the shape of the screen area dedicated to a data modeling application on a user device.

Figure 4:
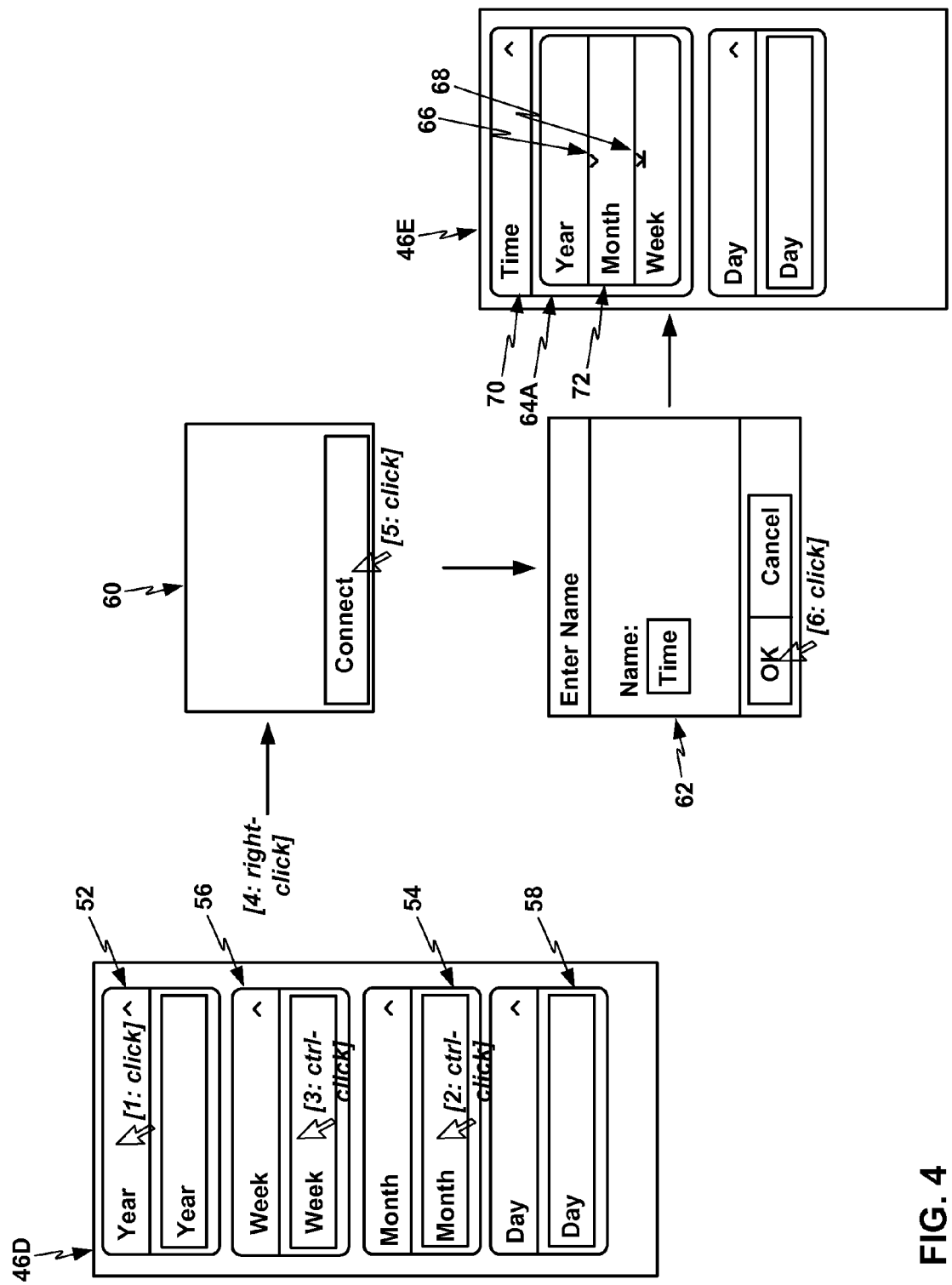
FIG. 4 depicts a conceptual diagram of a data modeling GUI through successive stages of outputs by a data modeling GUI application and of inputs by a user interacting with a data modeling GUI, in one example.

FIG. 4 depicts a conceptual diagram of a data modeling graphical user interface (GUI) 46D, 46E (or referred to generally as GUI 46) through successive stages of outputs by a data modeling GUI application 27 (as referenced in FIG. 2) and of inputs by a user interacting with data modeling GUI 46D. Data modeling GUI 46D displays various data item graphical elements 52, 54, 56, 58, each of which is a graphical representation in GUI 46D that graphically represents a data item from a data store, such as one of data stores 38 depicted in FIG. 2. Data item graphical elements 52, 54, 56, 58 may also be more simply referred to as data items 52, 54, 56, 58, with the understanding that they are graphical representations of the corresponding data items. These include a year data item 52, a week data item 56, a month data item 54, and a day data item 58. Data modeling GUI application 27 may adapt the placement, size, and/or shape of GUI 46D based at least in part on a size, resolution, and/or orientation of a device screen of a computing device used by a user to execute and interact with GUI 46D, as discussed above with reference to FIG. 3. FIG. 4 generally depicts a method of this disclosure for enabling a user to connect data items to create level-based and/or parent-child hierarchies for data modeling, and for representing the data modeling hierarchies in a compact manner that may adapt to available orientation, resolution, and/or size of a screen of a user device.

As shown in the example of FIG. 4, data modeling GUI 46D, controlled by a data modeling GUI application 27, enables a user to select, from data modeling GUI 46D, one or more of data items 52, 54, 56, 58, to connect together in a data model. In one example, a user may select the year data item 52 by clicking on it, and then select the month data item 54 and week data item 56 by control-clicking on them. Data modeling GUI application 27 may interpret these inputs as selecting all three of data items 52, 54, and 56 in order. The user may then right-click in GUI 46D, which data modeling GUI application 27 may respond to by outputting a connect button 60. The user may click the connect button 60, and in response, data modeling GUI application 27 may generate a name input box 62.

The user may enter a text input, "time," into a text field of name input box 62 to name a data model that includes the selected data items 52, 54, 56. Data modeling GUI application 27 then outputs a time data model box 64A as a hierarchical data graphical representation, as shown in data modeling GUI 46E, that graphically represents the selected data items 52, 54, 56 and the hierarchical association between the selected data items 52, 54, 56. Data modeling GUI 46E depicts the state of the data modeling GUI after the interactions described above that produce time data model box 64A. Time data model box 64A includes the title "time" in a header field 70 of data model box 64A, and includes the selected data items 52, 54, 56 in a body section 72 of data model box 64A.

Time data model box 64A also includes connector graphical elements 66 and 68 that each indicate a level-based hierarchy between the two respective adjoining data items. Connector graphical element 66 indicates a level-based hierarchy between the adjoining year data item 52 and month data item 54, while connector graphical element 68 indicates a level-based hierarchy between the adjoining month data item 54 and week data item 56, where the week data item 56 is the lowest level in the level-based hierarchy. Connector graphical element 68 may indicate that the week data items 56 are also subordinate to or contained within the year data items 52, while the month data items 54 are also subordinate to or contained within the year data items 52. Data modeling GUI 46E therefore positions the selected data items, e.g., with the most generic data item, the year data item 52, at the top of body section 72, and the most specific of the selected data items, the week data item 56, at the bottom of body section 72, with the selected data items connected to each other within body section 72. Data modeling GUI 46E visually represents the connected data items 52, 54, and 56, to facilitate easy recognition of a type of hierarchy, e.g., level-based in this case, or parent-child hierarchy in other examples, and the sequence of the data items within the time data model 64A.

Time data model box 64A graphically represents a data model that may be generated by data modeling GUI application 27 in response to the user interactions described above. The data model may correspond to the sequence of levels in a tree data model, with the data item in the highest position of the body 72 of time data model box 64A, in this case the year data item 52, corresponding to the root of the data model, and the data item in the lowest position of the body 72 of time data model box 64A, in this case the week data item 56, corresponding to the leaves of the data model. Data modeling GUI application 27 may also enable each level of the data model to be expanded and re-collapsed, where FIG. 4 shows time data model box 64A with each of its levels, data items 52, 54, and 56, in a collapsed state. Data modeling GUI application 27 may enable a user to expand any of data items 52, 54, and 56, such as by clicking on one of them.

Data modeling GUI application 27 may also adapt the output of the graphical representation of time data model box 64A for different sizes, resolutions, or orientations of a user device screen by expanding or rearranging the data items 52, 54, and 56, or by expanding one of data items 52, 54, and 56 in different modes of expansion in response to a user input selecting an expansion. For example, data modeling GUI application 27 may expand one of data items 52, 54, and 56 in a single column if the user device screen is below a certain size, below a certain resolution, or in a vertical orientation, or data modeling GUI application 27 may expand one of data items 52, 54, and 56 in multiple columns if the user device screen is above a certain size, above a certain resolution, or in a horizontal orientation. When data modeling GUI application 27 expands one of data items 52, 54, and 56 in multiple columns, data modeling GUI application 27 may present the data from the column from top to bottom and from left to right, in one example, or in other arrangements in other examples. Data modeling GUI application 27 may also save a data structure corresponding to time data model box 64A, which associates the two or more data items to a data store comprised in an enterprise BI system, such as a data store 38 in enterprise BI system 14 as shown in FIG. 2. For example, data modeling GUI application 27 may save time data model box 64A as a time dimension in a multidimensional data store.

Figure 5:
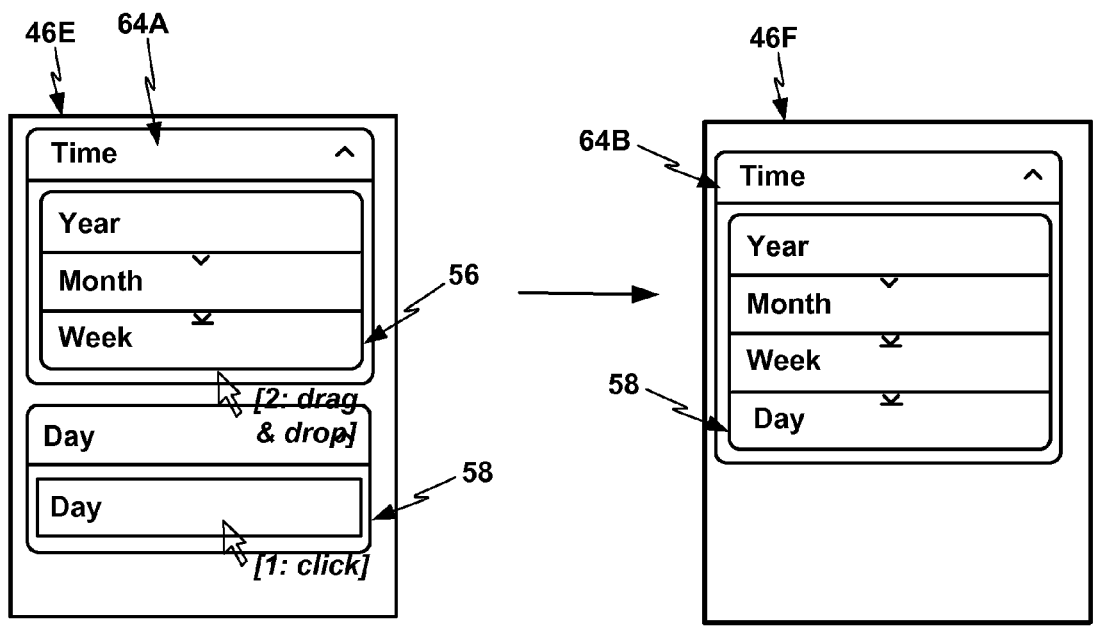
FIG. 5 shows further interactions of a user with a data modeling GUI application in a data modeling GUI, in one example.

FIG. 5 shows further interactions of a user with data modeling GUI application 27 in data modeling GUI 46E. As shown in FIG. 5, the user may also select the day data item 58 to add to the time data model box 64A, such as by clicking on the day data item 58 and performing a drag-and-drop input, dragging the day data item 58 to the time data model box 64A and dropping the day data item 58 on the time data model box 64A. In particular, the user may drop the day data item 58 onto the week data item 56. Data modeling GUI application 27 may respond to this input by combining the day data item 58 into the time data model box 64A and altering time data model box 64A into time data model box 64B that includes day data item 58 connected to week data item 56, as shown in GUI 46F.

In other examples, data modeling GUI application 27 may enable user inputs to form connections between data items and to manipulate data items into connected hierarchical associations in any of a wide variety of input mechanisms. These input mechanisms may include clicks, right-clicks, control-clicks, simple touch inputs on a touch-sensitive display screen (e.g., single fingertip), or complex touch inputs on a touch-sensitive display screen (e.g., single fingertip, double fingertip, or touch and hold, potentially also with associated motion). A right-click may refer to a click with a right-hand button or other non-primary button of a mouse, and a control-click may refer to a click of a mouse button while holding down a control button on a keyboard. These input mechanisms indicated above may also include menu item selection from a menu that may be accessed in a toolbar GUI section or by a selected input (e.g., right-click) in an arbitrary section of GUI 46.

A system of this disclosure may therefore offer a simple way to connect data items with intuitive visuals to represent hierarchy types. A system of this disclosure may allow a user to construct data model hierarchies in an interactive, intuitive, and visual manner. A system of this disclosure may be independent from a target visualization and independent from the data.

Figure 6:
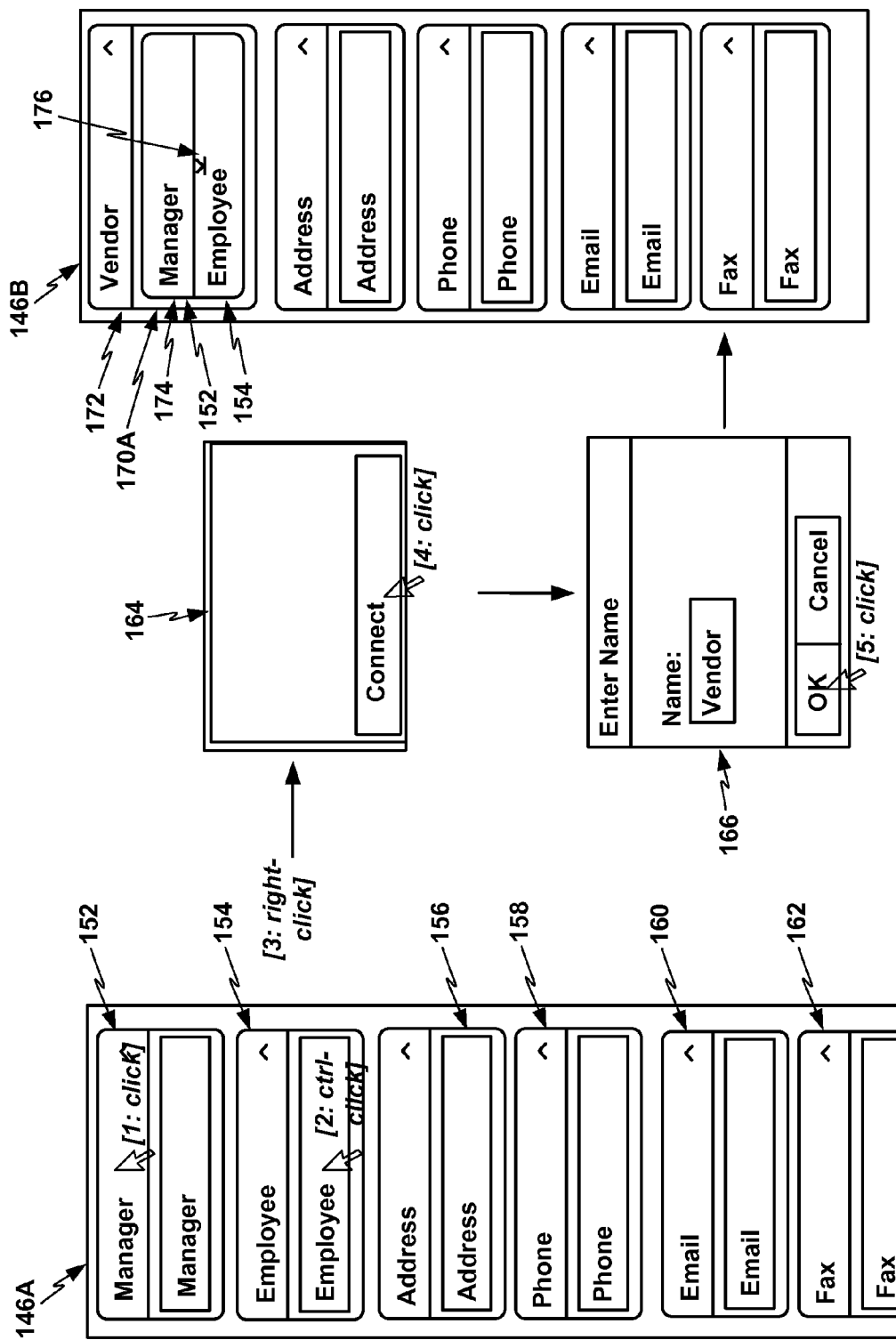
FIG. 6 depicts a conceptual diagram of another data modeling GUI through successive stages of outputs by a data modeling GUI application and of inputs by a user interacting with data modeling GUI, in one example.

FIG. 6 depicts a conceptual diagram of another data modeling graphical user interface (GUI) 146A, 146B (or referred to generally as GUI 146) through successive stages of outputs by a data modeling GUI application 27 (as referenced in FIG. 2) and of inputs by a user interacting with data modeling GUI 146. The example of FIG. 6 demonstrates assembly of a parent-child hierarchy data model, rather than a level-based hierarchy data model. Data modeling GUI 146A displays various data item graphical elements 152, 154, 156, 158, 160, and 162, each of which is a graphical representation in GUI 146A that graphically represents a data item from a data store, such as one of data stores 38 depicted in FIG. 2. As in the example of FIGS. 4 and 5, data item graphical elements 152, 154, 156, 158, 160, and 162 may also be more simply referred to as data items 152, 154, 156, 158, 160, and 162, with the understanding that they are graphical representations of the corresponding data items. In this example, these include a manager data item 152, an employee data item 154, an address data item 156, a phone data item 158, an email data item 160, and a fax data item 162.

As in the example of FIGS. 4 and 5, data modeling GUI application 27 may adapt the placement, size, and/or shape of GUI 146A based at least in part on a size, resolution, and/or orientation of a device screen of a computing device used by a user to execute and interact with GUI 46D. FIG. 6 generally depicts a method of this disclosure for enabling a user to connect data items to create level-based and/or parent-child hierarchies for data modeling, and for representing the data modeling hierarchies in a compact manner that may adapt to available orientation, resolution, and/or size of a screen of a user device.

As shown in the example of FIG. 6, data modeling GUI 146A, controlled by a data modeling GUI application 27, enables a user to select, from data modeling GUI 146A, one or more of data items 152, 154, 156, 158, 160, and 162, to connect together in a data model. In this example, a user may select the manager data item 152 by clicking on it, and then select the employee data item 154 by control-clicking on it. Data modeling GUI application 27 may interpret these inputs as selecting both of data items 152 and 154 in order. The user may then right-click in GUI 146A, which data modeling GUI application 27 may respond to by outputting a connect button 164. The user may click the connect button 164, and in response, data modeling GUI application 27 may generate a name input box 166.

The user may enter a text input, "vendor," into a text field of name input box 166 to name a data model that includes the selected manager data item 152 and the selected employee data item 154. Data modeling GUI application 27 then outputs a vendor data model box 170A as a hierarchical data graphical representation, as shown in data modeling GUI 146B, that graphically represents the selected data items 152 and 154 and the hierarchical association between the selected data items 152 and 154. Data modeling GUI 146B depicts the state of the data modeling GUI 146 after the interactions described above that result in data modeling GUI application 27 generating the vendor data model box 170A. The vendor data model box 170A includes the title "vendor" in a header field 172 of data model box 170A, and includes the selected data items 152 and 154 in a body section 174 of data model box 170A. Data modeling GUI 146B also shows data items 156, 158, 160, and 162 still without any connections to other data items, in the same state as in data modeling GUI 146A prior to the user interactions described above.

The vendor data model box 170A also includes a connector graphical element 176 that indicates a level-based hierarchy between the two respective adjoining data items, manager data item 152 and employee data item 154. Connector graphical element 176 may indicate that the employee data items 174 are subordinate to and the lowest level of the manager data items 172. Data modeling GUI 146B therefore positions the selected data items 152 and 154, e.g., with the most generic data item, the manager data item 152, at the top of body section 174, and the most specific of the selected data items, the employee data item 154, at the bottom of body section 174, with the selected data items connected to each other within body section 174. Data modeling GUI 146B visually represents the connected data items 152 and 154 to facilitate easy recognition of a type of hierarchy, e.g., level-based at this point in this example, and the sequence of the data items within the vendor data model 170A. Data modeling GUI 146B also enables the user to change the type of hierarchy of the data model 170A, as shown in FIG. 7.

Figure 7:
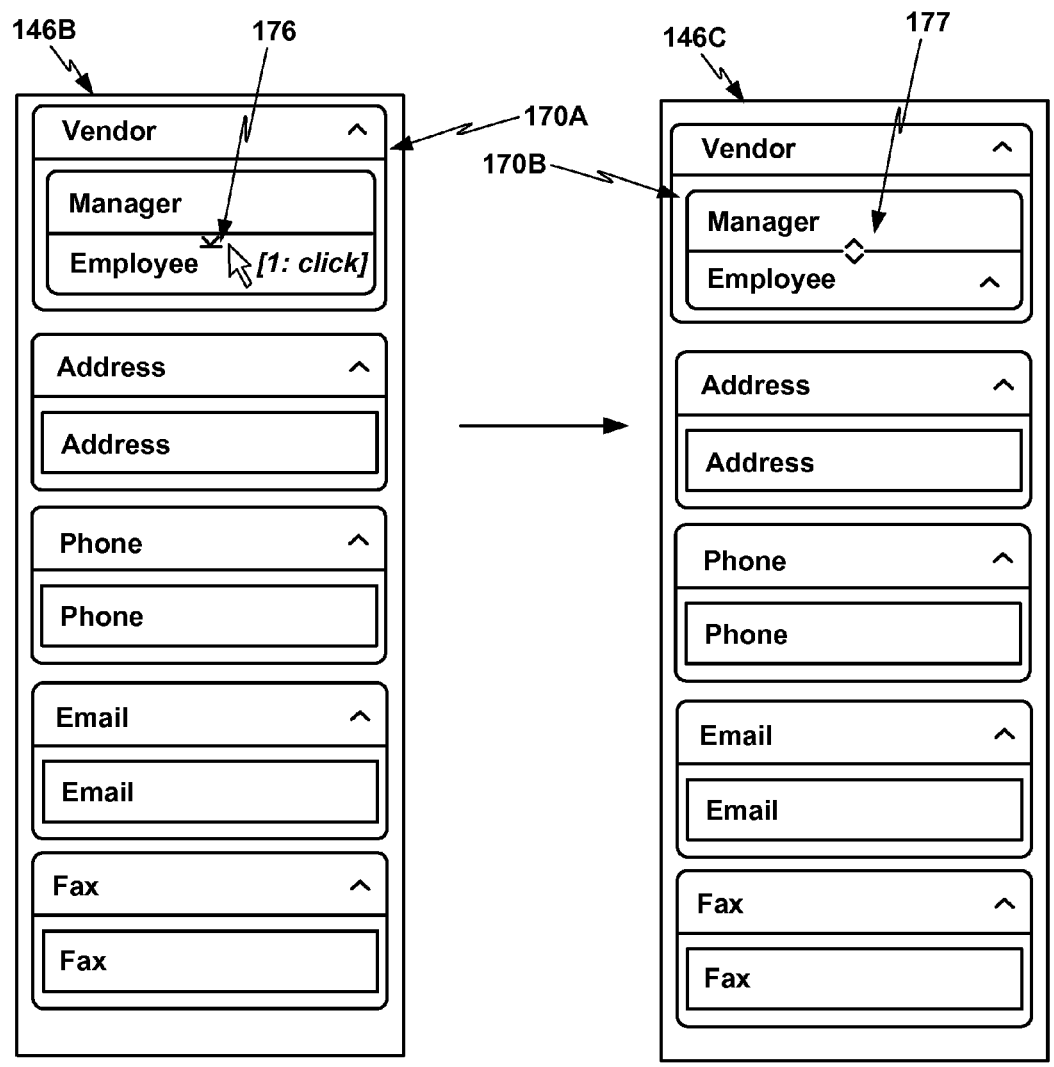
FIG. 7 shows a data modeling GUI enabling a user to select a connector graphical element to switch or toggle to a different connector graphical element, in one example.

FIG. 7 shows data modeling GUI 146B enabling a user to select the connector graphical element 176 to switch or toggle to a different connector graphical element 177, as shown in data model 170B in data modeling GUI 146C. Connector graphical element 177 graphically represents a connection for a parent-child hierarchical data model rather than a level-based data model. The user may enter an input to select and modify the type of hierarchical connection in data model 170A simply by clicking on the connector graphical element 176, in this example. In this example, data modeling GUI application 27 may initially generate a data model in a level-based hierarchy as an initial default, and output connector graphical element 176 corresponding to a level-based hierarchy in its initial graphical output of data model 170A, and enable a single-click input on connector graphical element 176 to switch data model 170A to a parent-child hierarchy, as graphically represented in data model 170B with connector graphical element 177. In other examples, data modeling GUI application 27 may enable other inputs to select a type of hierarchy for a data model, such as a menu selection.

Figure 8:
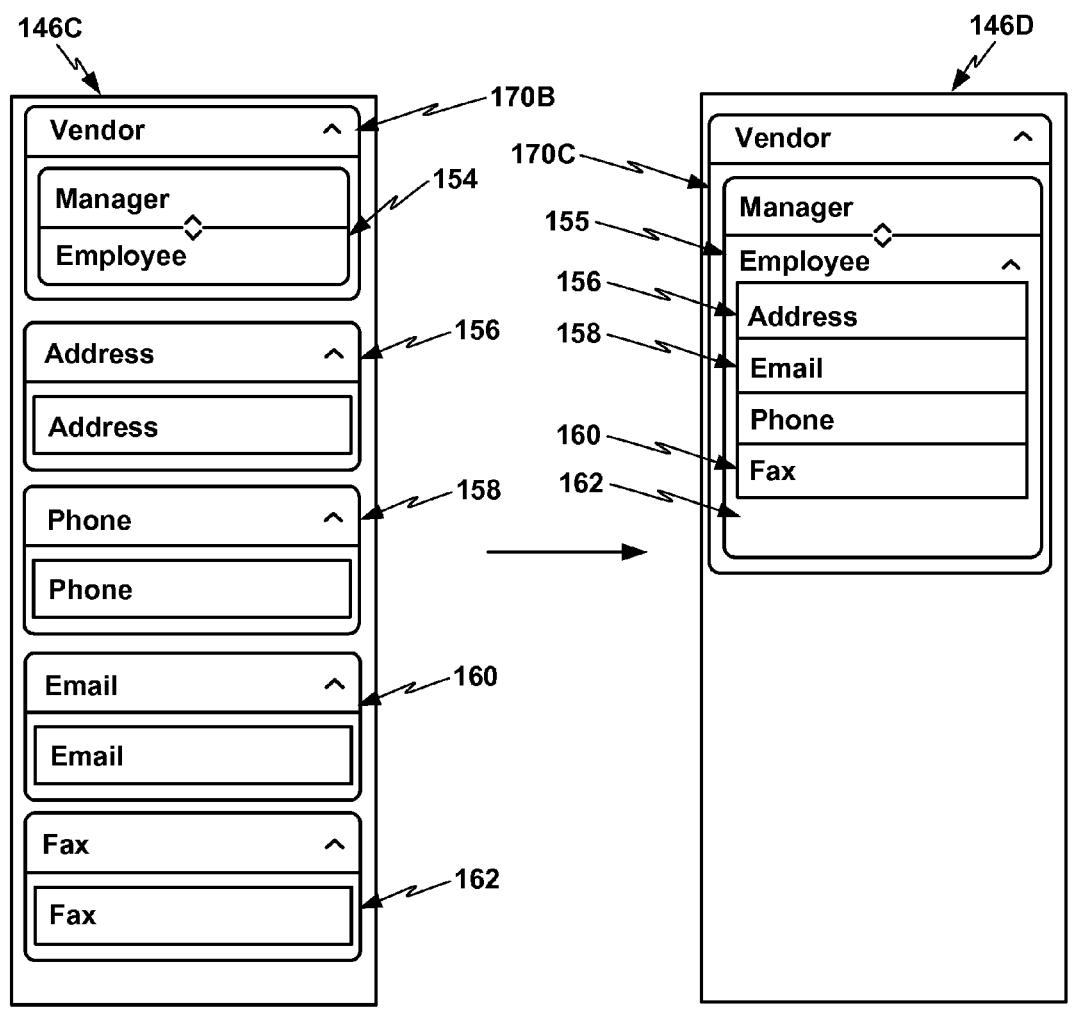
FIG. 8 shows further interactions enabled by a data modeling GUI application receiving inputs from a user and generating outputs in data modeling GUI, in one example.

FIG. 8 shows further interactions enabled by data modeling GUI application 27 receiving inputs from a user and generating outputs in data modeling GUI 146. In the example of FIG. 8, data modeling GUI 146C includes the vendor data model 170B with manager and employee data items, and data modeling GUI 146C also includes the address, phone, email, and fax data items 156, 158, 160, and 162, respectively, each unconnected from other data items.

In this example, the user may select the address data item 156, the email data item 158, the phone data item 160, and the fax data item 162, in that order, e.g., by clicking on address data item 156 and then by control-clicking on email data item 158, phone data item 160, and fax data item 162, respectively, such that all four data items 156, 158, 160, and 162 remain selected at the same time. The user may then perform a drag-and-drop input to drag the four data items 156, 158, 160, and 162 to the position of the employee data item 154 within data model 170B in data modeling GUI 146C and drop the data items 156, 158, 160, and 162 onto employee data item 154. In response, data modeling GUI application 27 adds data items 156, 158, 160, and 162 as descriptive attributes to employee data item 154, and changes the output of employee data item 154 to employee data item 155 as shown in data modeling GUI 146D. Data modeling GUI application 27 differentiates children levels in a parent-child hierarchy such as employee data item 155 from descriptive children attributes such as data items 156, 158, 160, and 162.

Data modeling GUI application 27 may also save a data structure corresponding to vendor data model box 170C, that associates the data items 152, 155, 156, 158, 160, and 162, to a data store comprised in an enterprise BI system, such as a data store 38 in enterprise BI system 14 as shown in FIG. 2. For example, data modeling GUI application 27 may save the vendor data model box 64A in a data model with manager data item 152 and employee data item 155 in a parent-child hierarchy, with data items 156, 158, 160, and 162 stored as descriptive attributes of the employee data item 155.

Figure 9:
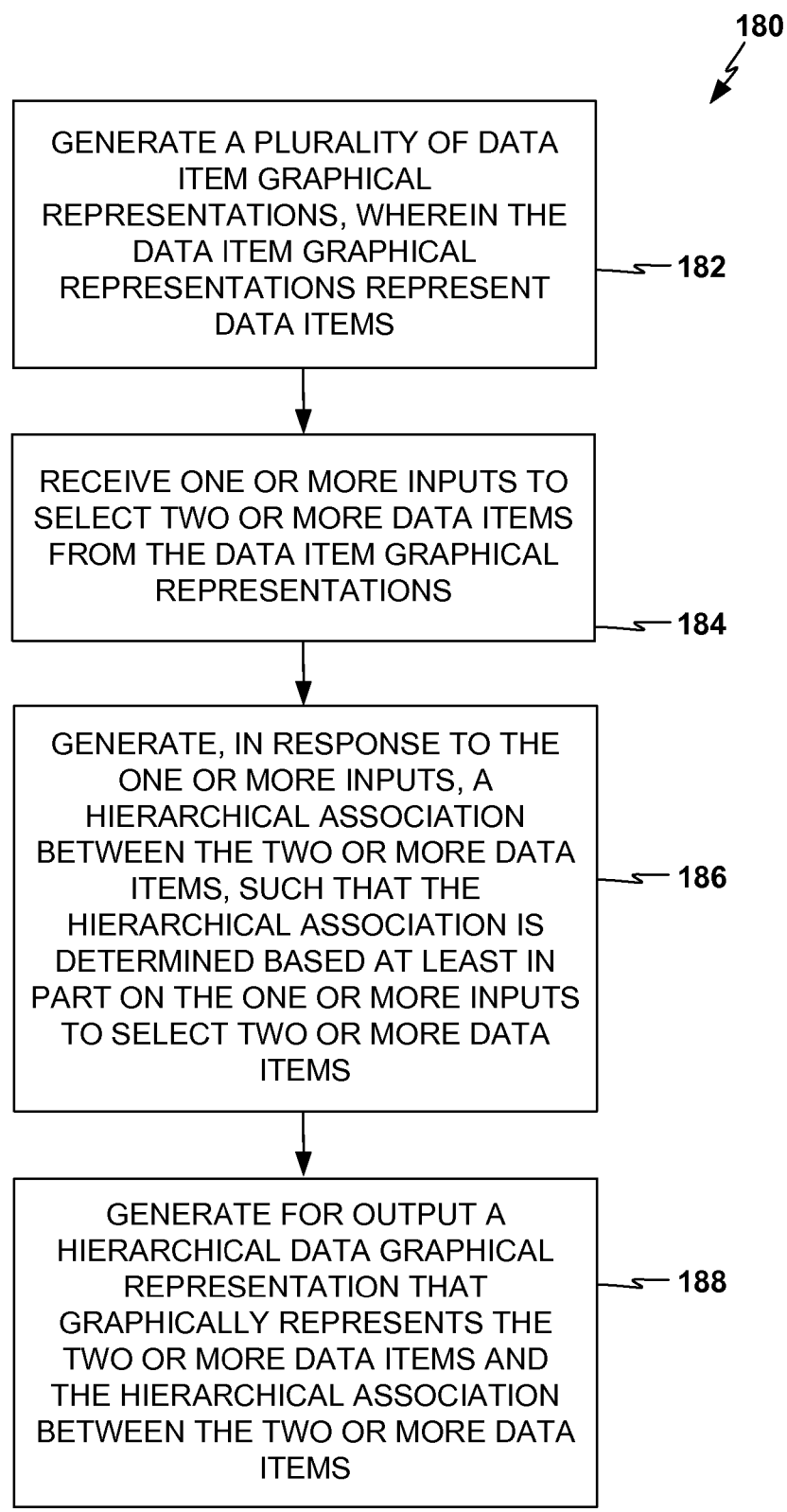
FIG. 9 depicts a process for modeling data in a data modeling GUI in a business intelligence (BI) system.

FIG. 9 shows a flowchart for an example overall process 170 that data modeling GUI application 27 (potentially implemented as data modeling GUI tool 22), executing on one or more computing devices (e.g., servers, computers, processors, etc.), may perform. For purposes of this description, data modeling GUI application 27 may include any application or other set of executable instructions for executing data modeling GUI application 27 as described above, e.g., on client computing device 16A and/or by enterprise BI system 14. Data modeling GUI application 27 may generate for output a plurality of data item graphical representations (e.g., data items 52, 54, 56, 58 in data modeling GUI 46D as in FIG. 4; data items 152, 154, 156, 158, 160, 162 in data modeling GUI 146A as in FIG. 6), wherein the data item graphical representations represent data items (e.g., data items comprised in a data store 38 in enterprise BI system 14 as in FIG. 2) (182). Data modeling GUI application 27 may receive one or more inputs to select two or more data items from the data item graphical representations (e.g., the user inputs to data items 52, 54, 56, 58 and connect button 60 in data modeling GUI 46D as described above with reference to FIG. 4; the user inputs to data items 152, 154, 156, 158, 160, and 162 and connect button 164 in data modeling GUI 146A as described above with reference to FIG. 6, and user inputs to connector graphical element 176 as described above with reference to FIG. 7) (184).

Data modeling GUI application 27 may generate, in response to the one or more inputs, a hierarchical association between the two or more data items, such that the hierarchical association is determined based at least in part on the one or more inputs to select two or more data items (e.g., a level-based data hierarchy between data items 52, 54, and 56 as in FIG. 4; a level-based hierarchy between data items 152 and 154 as in FIG. 6; a parent-child hierarchy between data items 152 and 154 as in FIG. 7) (186). This may include data modeling GUI application 27 determining the hierarchical association to be a level-based hierarchy as a default, as in the example of FIG. 6, or based at least in part on receiving inputs to select more than two data items, as in the example of FIG. 4. This may include data modeling GUI application 27 determining the hierarchical association to be a parent-child hierarchy based on receiving an input to click or otherwise select the connector graphical element 176 to switch or toggle it to connector graphical element 177 as in FIG. 7. Data modeling GUI application 27 may generate for output a hierarchical data graphical representation that graphically represents the two or more data items and the hierarchical association between the two or more data items (e.g., time data model box 64A including connector graphical elements 66 and 68 indicating level-based data hierarchy between data items 52, 54, and 56 as in FIG. 4; vendor data model box 170A including data items 152 and 154 with connector graphical element 176 that indicates a level-based hierarchy as in FIG. 6; vendor data model box 170B including data items 152 and 154 with connector graphical element 177 that indicates a parent-child hierarchy as in FIG. 7) (188).

Figure 10:
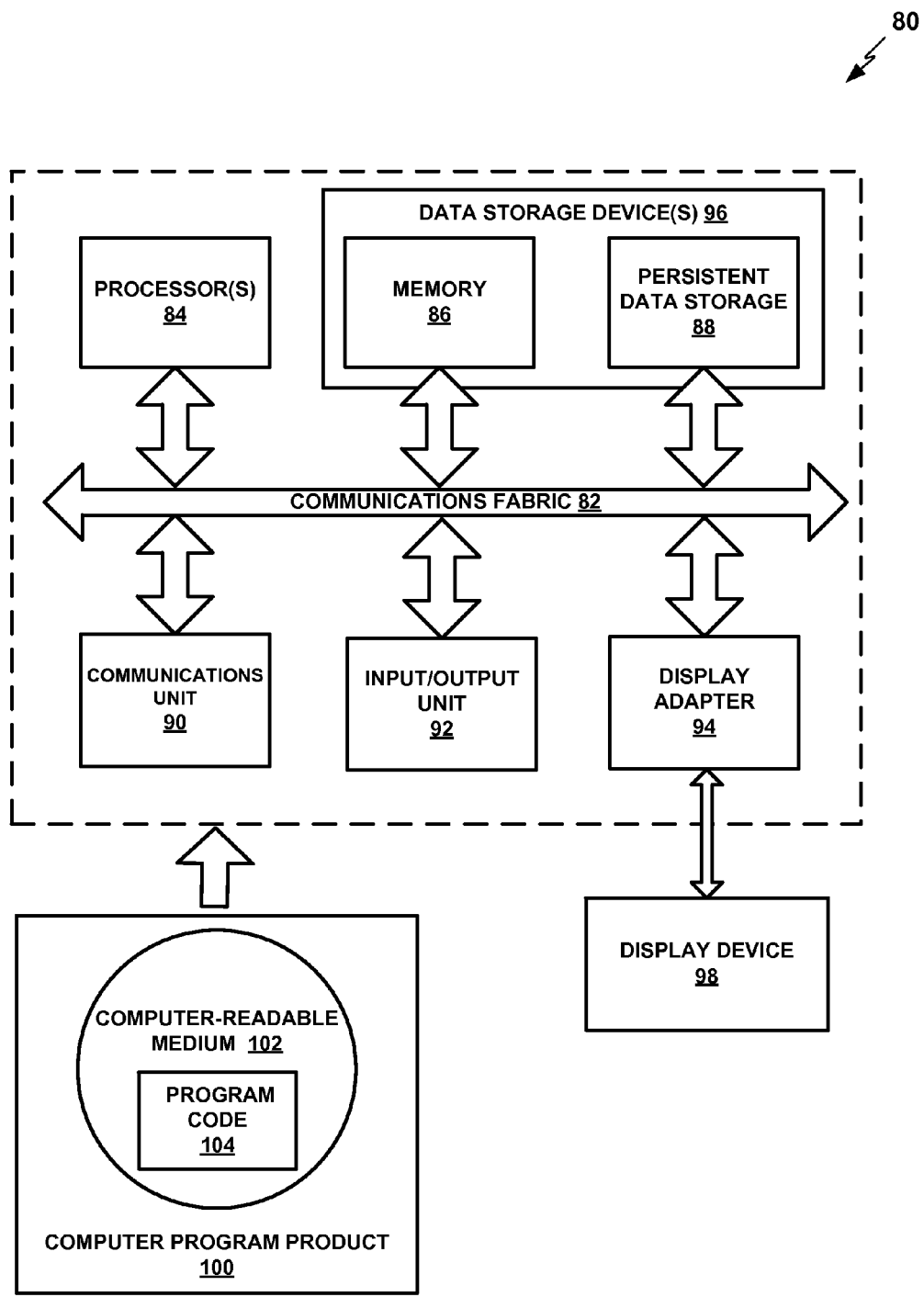
FIG. 10 is a block diagram of a computing device that may execute a system for modeling data in a data modeling GUI as part of a BI computing system.

FIG. 10 is a block diagram of a computing device 80 that may be used to execute a data modeling GUI tool 22, according to an illustrative example. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 10, computing device 80 includes communications fabric 82, which provides communications between one or more processor unit(s) 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

One or more data storage device(s) 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a data modeling GUI tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   generating for output, by a computing device, a plurality of data item graphical representations, wherein the data item graphical representations represent data items;
   receiving, by the computing device, one or more inputs to select two or more data items from the data item graphical representations;
   generating, by the computing device, in response to the one or more inputs, a hierarchical association between the two or more data items, such that the hierarchical association is determined based at least in part on the one or more inputs to select two or more data items;
   generating for output, by the computing device, a hierarchical data graphical representation that graphically represents the two or more data items and comprises a connector graphical element that indicates a type of the hierarchical association between the two or more data items; and
   switching, by the computing device, in response to a user input to select the connector graphical element, the hierarchical association of the two or more data items from the indicated type of the hierarchical association to a different type of hierarchical association, wherein at least one of:
   wherein generating the hierarchical association between the two or more data items comprises generating the hierarchical association with an initial default type of hierarchy, and wherein switching the hierarchical association in response to the user input comprises switching the hierarchical association from the initial default type of hierarchy to a user-selected type of hierarchy; or
   wherein the connector graphical element indicates the type of the hierarchical association as either a level-based hierarchy or a parent-child hierarchy, and wherein switching the hierarchical association in response to the user input comprises switching the hierarchical association between the level-based hierarchy and the parent-child hierarchy.

2. The method of claim 1, wherein graphically representing the hierarchical association between the two or more data items comprises representing a first data item from the two or more data items in a header of the hierarchical data graphical representation, and representing one or more additional data items from the two or more data items in a body of the hierarchical data graphical representation.

3. The method of claim 1, further comprising determining that the hierarchical association is a level-based hierarchy based at least in part on the one or more inputs to select the two or more data items, and wherein generating the hierarchical association comprises generating a data structure that associates the two or more data items in the level-based hierarchy.

4. The method of claim 1, wherein the two or more data items consist of two data items, the method further comprises determining that the hierarchical association is a parent-child hierarchy, and wherein generating the hierarchical association comprises generating a data structure that associates the two data items in the parent-child hierarchy.

5. The method of claim 1, wherein generating the hierarchical association comprises saving a data structure that associates the two or more data items to a data store comprised in a computing system.

6. The method of claim 1, wherein generating for output the plurality of data item graphical representations comprises selecting an output format based at least in part on a screen orientation of a user device.

7. The method of claim 1, wherein generating for output the plurality of data item graphical representations comprises selecting an output format based at least in part on a screen resolution of a user device.

8. The method of claim 1, wherein generating for output the plurality of data item graphical representations comprises selecting an output format based at least in part on a screen size of a user device.

9. The method of claim 1, wherein receiving the one or more inputs to select the two or more data items comprises enabling a drag-and-drop input to select at least one of the two or more data items.

10. The method of claim 1, wherein receiving the one or more inputs to select the two or more data items comprises enabling one or more point-and-click inputs to select at least one of the two or more data items.

11. The method of claim 1, further comprising storing the determined hierarchical association between the two or more data items.

12. The method of claim 1, wherein the initial default type of hierarchy is a level-based hierarchy, and wherein switching the hierarchical association in response to the user input comprises switching the hierarchical association from the level-based hierarchy to the parent-child hierarchy.

13. A computer program product for modeling data, the computer program product comprising a computer-readable storage medium having instructions stored thereon that, when executed, cause a computing device to:
generate for output a plurality of data item graphical representations, wherein the data item graphical representations represent data items;
receive one or more inputs to select two or more data items from the data item graphical representations;
generate in response to the one or more inputs, a hierarchical association between the two or more data items, such that the hierarchical association is determined based at least in part on the one or more inputs to select two or more data items;
generate for output a hierarchical data graphical representation that graphically represents the two or more data items and comprises a connector graphical element that indicates a type of the hierarchical association between the two or more data items; and
switch, in response to a user input to select the connector graphical element, the hierarchical association of the two or more data items from the indicated type of the hierarchical association to a different type of hierarchical association, wherein at least one of:
wherein the instructions that, when executed, cause the computing device to generate the hierarchical association between the two or more data items comprise instructions that, when executed, cause the computing device to generate the hierarchical association with an initial default type of hierarchy, and wherein the instructions that, when executed, cause the computing device to switch the hierarchical association in response to the user input comprise instructions that, when executed, cause the computing device to switch the hierarchical association from the initial default type of hierarchy to a user-selected type of hierarchy; or
wherein the connector graphical element indicates the type of the hierarchical association as either a level-based hierarchy or a parent-child hierarchy, and wherein the instructions that, when executed, cause the computing device to switch the hierarchical association in response to the user input comprise instructions that, when executed, cause the computing device to switch the hierarchical association between the level-based hierarchy and the parent-child hierarchy.

14. The computer program product of claim 13, wherein graphically representing the hierarchical association comprises representing a first data item from the two or more data items in a header of the hierarchical data graphical representation, and representing one or more additional data items from the two or more data items in a body of the hierarchical data graphical representation.

15. The computer program product of claim 13, wherein the instructions, when executed, further cause the computing device to determine that the hierarchical association is a level-based hierarchy based at least in part on the one or more inputs to select the two or more data items, and wherein the instructions that, when executed, cause the computing device to generate the hierarchical association comprise instructions that, when executed, cause the computing device to generate a data structure that associates the two or more data items in the level-based hierarchy.

16. The computer program product of claim 13, wherein the two or more data items consist of two data items, wherein the instructions, when executed, further cause the computing device to determine that the hierarchical association is a parent-child hierarchy, and wherein the instructions that, when executed, cause the computing device to generate the hierarchical association comprise instructions that, when executed, cause the computing device to generate a data structure that associates the two data items in the parent-child hierarchy.

17. The computer program product of claim 13, wherein the initial default type of hierarchy is a level-based hierarchy, and wherein the instructions that, when executed, cause the computing device to switch the hierarchical association in response to the user input comprise instructions that, when executed, cause the computing device to switch the hierarchical association from the level-based hierarchy to the parent-child hierarchy.

18. A computer system for modeling data, the computer system comprising:
one or more processors, one or more computer-readable memories, and one or more computer-readable, tangible storage devices;
program instructions, stored on at least one of the one or more storage devices for execution by at least one of the one or more processors via at least one of the one or more memories, to generate for output a plurality of data item graphical representations, wherein the data item graphical representations represent data items;
program instructions, stored on at least one of the one or more storage devices for execution by at least one of the one or more processors via at least one of the one or more memories, to receive one or more inputs to select two or more data items from the data item graphical representations;
program instructions, stored on at least one of the one or more storage devices for execution by at least one of the one or more processors via at least one of the one or more memories, to generate in response to the one or more inputs, a hierarchical association between the two or more data items, such that the hierarchical association is determined based at least in part on the one or more inputs to select two or more data items;

program instructions, stored on at least one of the one or more storage devices for execution by at least one of the one or more processors via at least one of the one or more memories, to generate for output a hierarchical data graphical representation that graphically represents the two or more data items and comprises a connector graphical element that indicates a type of the hierarchical association between the two or more data items; and program instructions, stored on at least one of the one or more storage devices for execution by at least one of the one or more processors via at least one of the one or more memories, to switch, in response to a user input to select the connector graphical element, the hierarchical association of the two or more data items from the indicated type of the hierarchical association to a different type of hierarchical association, wherein at least one of:

wherein the program instructions to generate the hierarchical association between the two or more data items comprise program instructions to generate the hierarchical association with an initial default type of hierarchy, and wherein the program instructions to switch the hierarchical association in response to the user input comprise program instructions to switch the hierarchical association from the initial default type of hierarchy to a user-selected type of hierarchy; or wherein the connector graphical element indicates the type of the hierarchical association as either a level-based hierarchy or a parent-child hierarchy, and wherein the program instructions to switch the hierarchical association in response to the user input comprise program instructions to switch the hierarchical association between the level-based hierarchy and the parent-child hierarchy.

19. The computer system of claim 18, wherein graphically representing the hierarchical association comprises representing a first data item from the two or more data items in a header of the hierarchical data graphical representation, and representing one or more additional data items from the two or more data items in a body of the hierarchical data graphical representation.

20. The computer system of claim 18, wherein the initial default type of hierarchy is a level-based hierarchy, and wherein the program instructions to switch the hierarchical association in response to the user input comprise program instructions to switch the hierarchical association from the level-based hierarchy to the parent-child hierarchy.

* * * * *